United States Patent [19]

Martner

[11] 4,442,443

[45] Apr. 10, 1984

[54] APPARATUS AND METHOD TO EJECT INK DROPLETS ON DEMAND

[75] Inventor: John G. Martner, Brookfield, Conn.

[73] Assignee: Exxon Research and Engineering Co., Florham Park, N.J.

[21] Appl. No.: 389,785

[22] Filed: Jun. 18, 1982

[51] Int. Cl.³ .......... G01D 15/18

[52] U.S. Cl. .......... 346/140 R; 310/323

[58] Field of Search .......... 310/323, 325; 346/75, 346/140 R, 140 PD

[56] References Cited

U.S. PATENT DOCUMENTS

| | | | |
|---|---|---|---|
| 3,329,964 | 6/1965 | Mutschler et al. | 346/78 |
| 3,334,354 | 3/1966 | Mutschler | 346/140 |
| 3,452,360 | 6/1969 | Williamson | 346/140 |
| 3,683,212 | 8/1972 | Zoltan | 310/323 |

FOREIGN PATENT DOCUMENTS

| | | | |
|---|---|---|---|
| 53-12352 | 2/1978 | Japan | 346/140 R |

*Primary Examiner*—Joseph W. Hartary
*Assistant Examiner*—Gerald E. Preston
*Attorney, Agent, or Firm*—Norman L. Norris

[57] ABSTRACT

An ink jet chamber including an orifice and an ink supply inlet is coupled to a transducer. The transducer is capable of displacement in two different directions which are coupled to the chamber in an additive manner so as to change the volume of the chamber as a result of the additive displacement of the transducer.

18 Claims, 4 Drawing Figures

APPARATUS AND METHOD TO EJECT INK DROPLETS ON DEMAND

BACKGROUND OF THE INVENTION

This invention relates to demand or impulse liquid jets of the type wherein a droplet of liquid is ejected from an orifice in response to a command at a frequency which can vary as the frequency of the commands.

Liquid jets of this type are employed in the ink jet art wherein droplets of ink are projected toward paper or another recording medium. In the ink jet art, it is particularly desirable to array a plurality of jets in a predetermined configuration so as to permit the simultaneous and selective ejection of droplets from a plurality of jets toward the paper or copy medium. Preferably, the jets are arrayed in a rather dense manner, i.e., the jets are closely packed with relatively small orifices, e.g., 5 mils in diameter, in order to achieve a high degree of resolution in the printing of alphanumeric material.

Copending application Ser. No. 336,603, filed Jan. 4, 1982 discloses a particular ink jet configuration adapted to be arrayed for use in alphanumeric printing. The technique for achieving an extremely dense array of the ink jets disclosed in the aforesaid application Ser. No. 336,603 are shown in copending application Ser. No. 229,992, filed Jan. 30, 1981. In the aforesaid application Ser. No. 229,992, the high density of the ink jet array is achieved by the use of untapered waveguides which couple displacement of a transducer to an ink chamber so as to expand and contract the chamber and eject a droplet of ink. It will be appreciated that the volume of ink in the chamber of this type is extremely small. The substantial or relatively large expansion and contraction of that volume must be achieved in order to eject a droplet of ink.

SUMMARY OF THE INVENTION

It is an object of this invention to provide an improved apparatus and method for effectuating a change in volume with a small-dimension ink jet chamber.

It is a more specific object of this invention to optimize the change in volume of an extremely small ink jet chamber for a given displacement of a transducer.

In accordance with these and other objects of the invention, the preferred embodiment of the invention comprises an ink jet chamber including a droplet ejection orifice and an ink supply inlet and transducer means capable of simultaneous displacement in opposite directions. Coupling means are coupled between the transducer means and the chamber such that displacement of the transducer in one direction is coupled to the chamber while displacement of the transducer in another direction is also coupled to the chamber such that the displacements of the transducer are additive in producing a change in volume of the chamber.

In a preferred embodiment of the invention, the coupling means comprises plunger-like means, preferably a waveguide, which acoustically couples a displacement of the transducer in one of the different directions to the chamber. Preferably, the coupling means also comprises a tubular means surrounding the waveguide which is coupled to the transducer so as to couple the displacement of the transducer in another of the directions to the chamber in an additive manner so as to create an additive change in volume of the chamber.

In the preferred embodiment of the invention, the transducer expands in opposite directions along an axis of the transducer and contracts in opposite directions along the axis of the transducer. The expansion and contraction of the transducer is achieved, preferably utilizing a piezoelectric crystal as the transducer and applying a voltage transverse to the axis of the transducer.

In the preferred embodiment of the invention, a portion of the tubular member forms the chamber. The tubular member also encloses the transducer such that the axis of the transducer is substantially coincident with the axis of the tubular member. Preferably, the tubular member includes a flange which is coupled to one end of the transducer while the opposite end of the transducer is coupled to the waveguide which extends directly to the chamber. In operation, expansion of the transducer drives the flange of the tubular member away from the chamber so as to pull the tubular means for the transducer and contract the chamber. At the same time, the opposite end of the transducer is expanding toward the chamber and this expansion is acoustically coupled to the chamber so as to further contract the chamber. In other words, expansion of opposite ends of the transducer are added so as to produce an additive contraction of the volume of the chamber by coupling means in the form of the tubular means and the waveguide.

In the preferred embodiment of the invention, the tubular member comprises the orifice and the inlet. In one embodiment of the invention, a restrictor flow path is formed between the waveguide and the tubular member at the inlet to the chamber parallel with the axis of the waveguide.

In accordance with one important aspect of the invention, the acoustic velocity of the tubular means and the waveguide may differ so as to produce a phased change in volume of the chamber. Preferably, the acoustic velocity of the tubular means is greater than that of the waveguide so as to match the times of arrival of said compressions at the chamber.

DETAILED DESCRIPTION OF A PREFERRED EMBODIMENT

Figure 1:
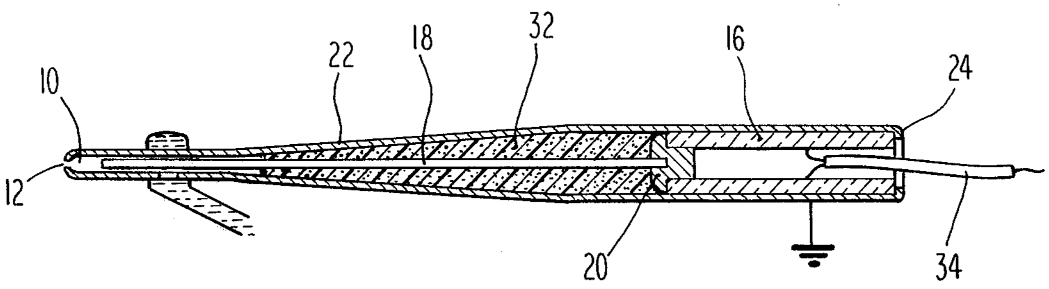
FIG. 1 is a sectional view of an ink jet apparatus embodying the invention.
Figure 2:
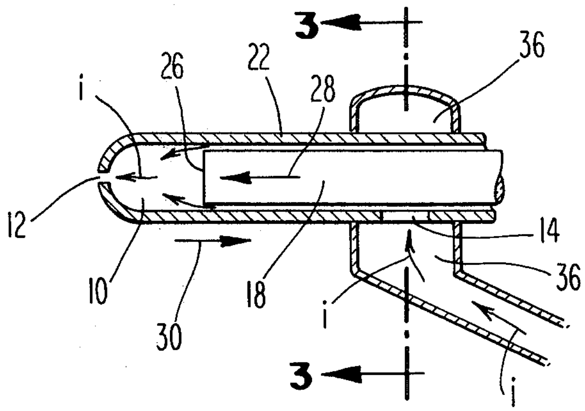
FIG. 2 is an enlarged view of a portion of the apparatus shown in FIG. 1.
Figure 3:
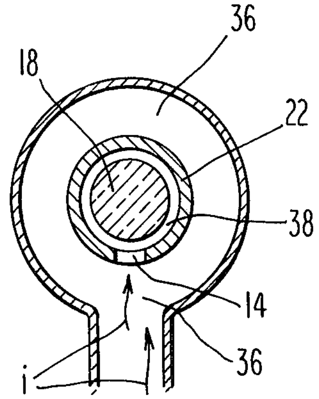
FIG. 3 is a sectional view taken along line 3—3 of FIG. 1.

Referring to FIGS. 1 through 3, an ink jet chamber 10 includes a droplet ejection orifice 12 and an ink supply inlet 14. A transducer means in the form of a piezoelectric crystal 16 is coupled to the chamber 10 with coupling means which will now be described.

The coupling means includes a plunger-like means in the form of a waveguide 18 which is connected to one end of the piezoelectric transducer 16 by means of a ferrule 20. The other end of the piezoelectric transducer 16 is coupled to the chamber 10 by a tubular means 22 including a flange 24 which is fixedly attached to the transducer 16.

In accordance with this invention, the transducer 16 with appropriate energization and de-energization which will be described hereinafter is capable of displacement in two different directions. More particularly, the transducer 16 is capable of displacement upon expansion in one direction along the axis of the transducer generally toward the chamber 10. Displacement of the transducer 16 in this direction is coupled to the chamber 10 through the waveguide 18. The transducer 16 is also capable of displacement in another direction opposite to the one direction and therefore generally away from the chamber 10. Displacement in this direction is coupled to the chamber 10 through the tubular member 22 which is attached to the opposite end of the transducer 16 at the flange 24. By energizing the transducer 16, displacement at opposite ends of the transducer 16 is coupled in an additive way to the chamber 10 so as to achieve an additive change in volume of the chamber 10. In other words, when the tubular member and the untapered waveguide 18 move toward each other causing the volume of the chamber 10 to diminish, a droplet will be ejected through the orifice 12. When the member 22 and the guide 18 move away from each other to increase the volume of the chamber 10, refilling of the chamber 10 occurs. This additive change in volume of the chamber 10 will now be described in further detail with reference to FIG. 2.

As shown in FIG. 2, expansion of the transducer 16 produces movement at the end 26 of the waveguide as depicted by an arrow 28 which serves to contract the chamber 10. Simultaneously, movement of the tubular member 22 in the direction depicted by the arrow 30 as a result of expansion of the transducer 16 also tends to contract the chamber 10. Thus, expansion at opposite ends of the transducer 16 is added so as to produce an additive contraction in the volume of the chamber 10.

Referring now to FIG. 1 as well as FIG. 2, it will be appreciated that the waveguide 18 is free to move through the tubular member 22. The tubular member 22 at one portion actually forms the chamber 10 with the orifice 12 and the inlet 14 actually being located in the tube 22. Another portion of the tube 22 encloses the transducer 16. An encapsulant 32 is located in the portion of the tubular member 22 between the transducer 16 and the chamber 10. The encapsulant 32 is chosen so as to minimize flexural resonances and ringing of the structure.

Electrical connection to the transducer 16 is made in the following manner. Conductive surfaces are applied to the exterior-interior cylindrical surfaces of the transducer 16. As shown in FIG. 1, the tubular member 22 is connected to ground and makes contact with the exterior cylindrical surface of the transducer 16 while the interior cylindrical surface is connected to a lead 34. As an operating signal voltage is applied through the lead 34 to the transducer 16, the transducer contracts thus expanding the volume of the chamber 10 by coupling the displacement of the transducer 16 through the waveguide 18 and the tubular member 22, i.e., the free end of the waveguide retracts toward the transducer 16 while the end of the tubular member forming the chamber 10 moves away from the waveguide 18 and the transducer 16.

In the preferred embodiment of the invention, a fluid flow path is established between the tubular member 22 and the waveguide 18 from the inlet 14 to the chamber 10. In order to supply ink to the inlet 14, a reservoir 36 is provided which encircles the tubular member 22 in the vicinity of the inlet 14. Small arrows i in the reservoir 36 and the chamber 10 generally indicate the flow of ink toward the orifice 12. Note the configuration of the reservoir 36 and the restricted flow path 38 as shown in FIG. 3.

In accordance with another important aspect of the invention, the acoustic velocity characteristic of the waveguide 18 and the tubular member 22 may be chosen so as to assure that the additive changes in volume at the chamber 10 arrive at the chamber 10 at the appropriate time so as to optimize the ejection of a droplet. In this connection, it is preferable that the acoustic velocity of the tubular member 18 be higher and the acoustic velocity of the waveguide 22 be slower so as to assure that both waves arrive at the chamber at the same time in order to thus cause a reduction in the volume of the chamber 10 and thereby cause ejection of ink droplets through the orifice 12.

Preferably, the tubular member 22 comprises stainless steel and the flexible waveguide 18 comprises brass or aluminum.

Figure 4:
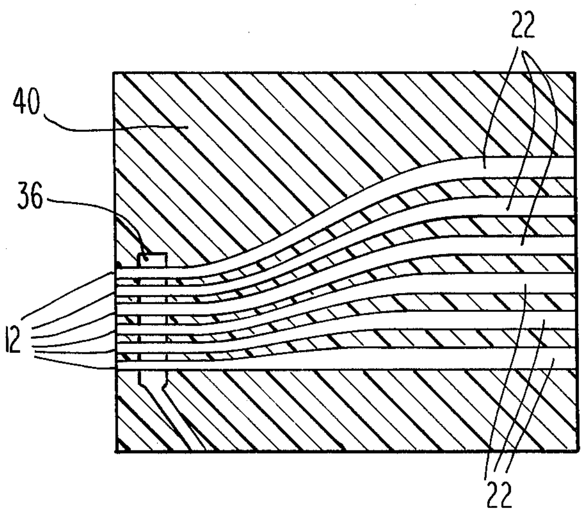
FIG. 4 depicts an array of ink jets of the type shown in FIGS. 1 through 3.

Note the configuration of the tubular member 22. More particular, the tubular member 22 tapers in diameter from a larger diameter at the transducers 16 to a much smaller diameter at the chamber 10. This allows the use of a plurality of jets of the type shown in FIGS. 1 through 3 in an array shown in FIG. 4 where the orifice-to-orifice spacing is extremely small so as to achieve high resolution while permitting the transducers 16 to be of a sufficiently large, practical diameter to accommodate the necessary circuit connections etc. As shown in FIG. 4, the tubular member 22 and the waveguides 18 encapsulated therein but not shown in FIG. 4 are bent in a manner so as to achieve a high density array of orifices 12. An enlarged reservoir 36 circles all of the tubular members 22 so as to supply ink to each of the inlets 14 thereof. The entire array of tubular members 22 are encapsulated in a suitable package 40. This encapsulation serves both to reduce flexural resonances and ringing and to act as a support to the tubular members and to keep them from contacting one another.

As shown herein, a particular transducer configuration has been chosen of the type disclosed in the aforesaid copending application Ser. No. 336,603 which is incorporated herein by reference. In that configuration, the application of an operating voltage to the transducer results in the contraction of the transducer along its axis and, upon deenergization, the transducer expands along its axis. It will, of course, be appreciated that the principles of this invention are applicable to other transducers and other transducer configurations. In other words, although the embodiment of this invention shown herein couples the displacement of the transducer in opposite directions along the axis of the transducer in an additive manner so as to contract the volume of the chamber in an additive manner, other transducer configurations may produce additive changes in the volume in accordance with this invention. For this reason, the invention is also applicable to other transducers including magnetostrictive devices.

It will also be appreciated that the manner in which ink is supplied to the chamber 10 may vary. For example, it is possible to apply the ink through the waveguide 18 itself rather than between the waveguide 18 and the tubular member 22. It is also possible to substitute other elongated coupling means 32 for the waveguide 18.

In view of the foregoing, it will be understood that the invention may be incorporated in various embodiments and various modifications will occur to those of ordinary skill in the art which fall within the true spirit and scope of the invention.

I claim:

1. An ink jet apparatus comprising:

an ink jet chamber including a droplet ejection orifice and an ink supply inlet;

transducer means capable of displacement in different directions; and coupling means coupled between said transducer means and said chamber, said coupling means coupling displacement of said transducer in one of said directions to said chamber so as to produce a first change of volume of said chamber and coupling displacement of said transducer in another of said directions to said chamber so as to produce a second change in volume of said chamber such that displacement of said transducer in different directions are additive in producing a change in volume of said chamber.

2. The ink jet apparatus of claim 1 wherein said transducer means comprises a transducer having one end and another end, said transducer expanding and contracting along an axis extending between said one end and said other end.

3. The ink jet apparatus of claim 2 wherein said coupling means comprises a waveguide coupled between said one end of said transducer and one end of said chamber.

4. The ink jet apparatus of claim 3 wherein said coupling means further comprises tubular means surrounding said waveguide and coupled between said other end of said transducer and the other end of said chamber.

5. The ink jet apparatus of claim 4 wherein said chamber comprises a portion of said tubular means, said waveguide extending through said tubular means.

6. The ink jet apparatus of claim 5 wherein another portion of said tubular means encloses said transducer.

7. The ink jet apparatus of claim 6 wherein said axis of said tubular means is substantially coincident with the axis of said transducer in said other portion.

8. The ink jet apparatus of claim 7 wherein said tubular means includes a flange contacting said other end of said transducer.

9. The ink jet apparatus of claim 5 wherein said tubular means comprises said inlet and said orifice.

10. The ink jet apparatus of claim 9 wherein a restrictive flow path is formed between said waveguide and said tubular means from said inlet to said chamber parallel with the axis of said waveguide.

11. The ink jet apparatus of claim 4 wherein said tubular means and said waveguide have different acoustic speeds.

12. The ink jet apparatus of claim 2 further comprising means for applying a voltage to said transducer transverse to said axis.

13. The ink jet appartus of claim 2 wherein said coupling means comprises an elongated means coupled between said one end of said transducer and one end of said chamber.

14. The ink jet apparatus of claim 13 wherein said coupling means further comprises tubular means surrounding said elongated means and coupled between said other end of said transducer and the other end of said chamber.

15. A method of operating an ink jet comprising a ink jet chamber including an ink droplet ejecting orifice and an inlet and a transducer capable of displacement in different directions, the method comprising the following steps:

coupling displacement of the transducer in one direction to said chamber so as to change the volume of the chamber in one direction; and coupling displacement of the transducer in another of said directions to said chamber so as to further change the volume of the chamber in an additive manner to the first change in volume.

16. The method of claim 15 wherein the first change in volume occurs before the second change in volume.

17. The method of claim 15 wherein the displacement of the transducer is achieved by expansion of the transducer in opposite directions along the axis of the transducer.

18. The method of claim 15 wherein a displacement of the transducer in said one of the directions is coupled to said chamber at an acoustic speed different from the acoustic speed with which the displacement of the transducer in another direction is coupled to the chamber.

* * * * *